United States Patent

[11] 3,622,465

| [72] | Inventors | Gerald Orgel<br>Highland Park;<br>Edward W. Pietrusza, Morristown; George<br>G. Joris, Madison, all of N.J. |
|---|---|---|
| [21] | Appl. No. | 622,243 |
| [22] | Filed | Mar. 10, 1967 |
| [45] | Patented | Nov. 23, 1971 |
| [73] | Assignee | Allied Chemical Corporation<br>New York, N.Y. |

[54] PROTEIN FROM NORMAL HYDROCARBONS
9 Claims, 1 Drawing Fig.

[52] U.S. Cl. ........................................... 195/96,
195/3 H, 195/28, 99/14
[51] Int. Cl. ........................................... A23j 1/00,
C12d 13/06
[50] Field of Search ........................................ 195/3, 3 H,
28, 96; 99/14

[56] References Cited
UNITED STATES PATENTS

| 2,396,900 | 5/1946 | Taggart .................... | 195/28 |
| 3,222,258 | 12/1965 | Jizuka et al. ............... | 195/3 H |
| 3,264,196 | 8/1966 | Filosa ....................... | 195/82 |
| 3,355,296 | 11/1967 | Perkins et al. ............ | 99/14 |
| 3,414,477 | 12/1968 | Durous et al. ............ | 195/28 |

*Primary Examiner*—Lionel M. Shapiro
*Attorney*—Arthur J. Plantamura

ABSTRACT: A process for the biosynthesis of protein wherein the micro-organism *Arthrobacter simplex* is cultivated under submerged aerobic conditions in an aqueous culture medium containing a $C_3$ to $C_{18}$ straight chain hydrocarbon as the principal source of assimilable carbon and energy, an assimilable source of nitrogen and essential inorganic salts and the organism growth is thereafter separated from said culture medium.

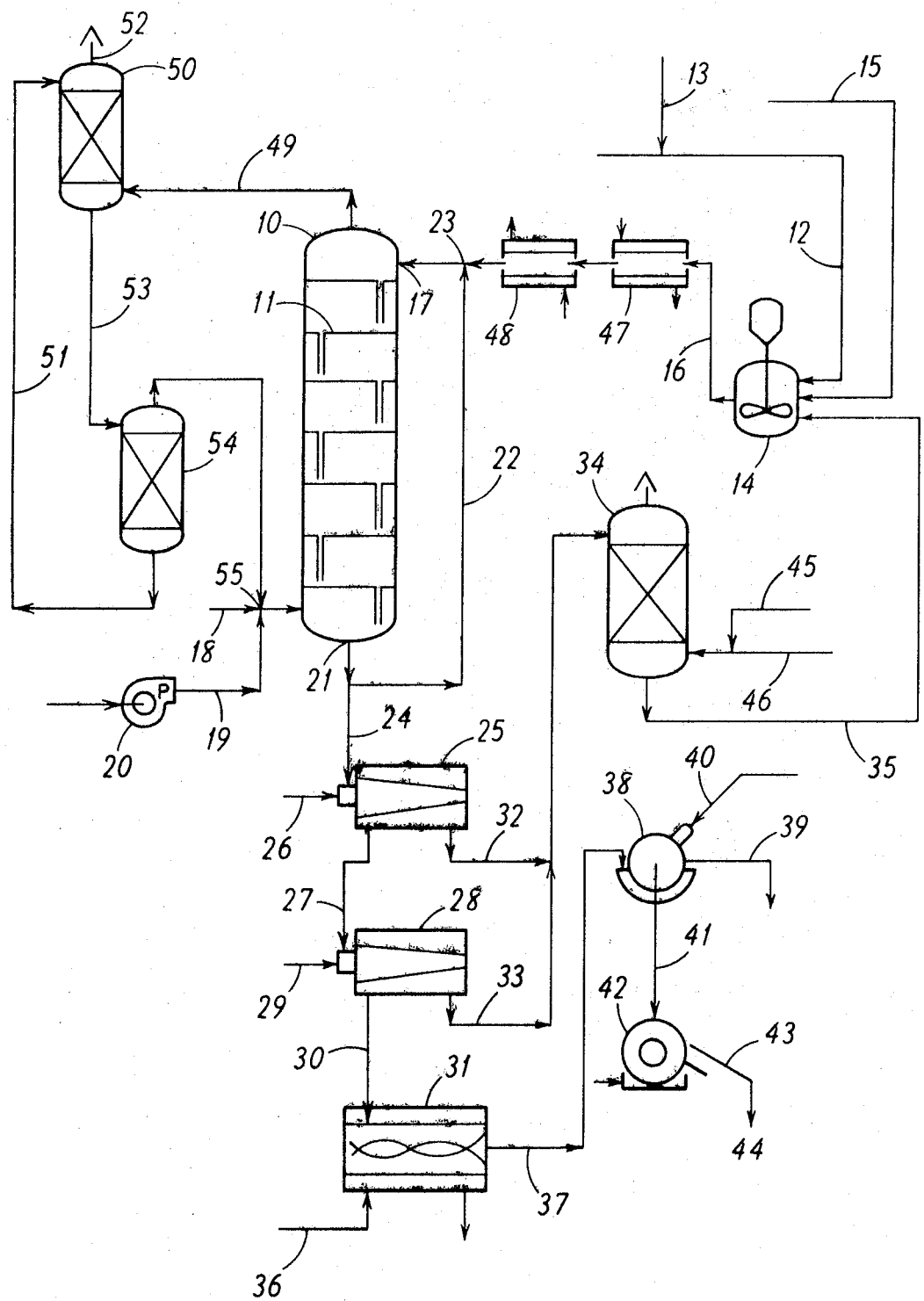

PROTEIN FROM NORMAL HYDROCARBONS

This invention relates to a process whereby the micro-organism *Arthrobacter simplex* utilizes $C_3$ to $C_{18}$ straight chain hydrocarbons as a principal source of assimilable carbon and energy to produce cell proteins in high yield and to the compositions of matter containing this micro-organism.

The desirability of a process for converting the readily available hydrocarbons obtained from petroleum or natural gas into edible protein is apparent when it is considered that a majority of the world's population suffers from protein deficiency to a greater or lesser extent.

Since about 1900 it has been known that some kinds of micro-organisms can use hydrocarbons as their sole source of carbon and energy. Growth of these organisms on various hydrocarbons to produce protein for food or feed has been proposed and disclosures in connection therewith are found in the technical literature. In addition, brewers yeast and yeast grown on wood sugars have been used for many years for both human and animal dietary supplements. However, most of these biosyntheses require expensive vitamins or other growth media additives in addition to a comparatively expensive carbohydrate as the source of assimilable carbon and energy in order to attain the desired rate of microbial cell growth.

Another recently developed technique for biologically synthesizing protein, but in very small yield, is the culture of micro-organisms on petroleum substrates to produce esters and chemicals as a major product and microbe cells as a byproduct in very small amounts. This latter type of protein synthesis usually involves the use of less expensive carbon-containing feed materials, e.g., hydrocarbons rather than carbohydrates, but this type of synthesis has not attained wide acceptance due to the difficulty of securing microbe cells having a high-protein content coupled with a sufficiently good amino acid profile. Other problems frequently connected with biosyntheses using hydrocarbon feed stocks are low cell growth rates (extremely long residence times) and inability of the microbe cells to utilize hydrocarbon feeds effectively for growth and reproduction.

It is a primary objective of this invention to provide an efficient biosynthetic process for converting straight chain hydrocarbons into edible protein. It is a further objective of this invention to provide a novel process for the production of protein with a good amino acid profile. Further objects and advantages will become apparent from the description of the invention which follows in greater detail.

These and other objects are accomplished according to our invention wherein an inoculum of a strain of the micro-organism *Arthrobacter simplex* is introduced into an aqueous culture medium containing a $C_3$ to $C_{18}$ straight chain hydrocarbon as the principal source of assimilable carbon and energy, an assimilable source of nitrogen, and essential inorganic salts. Assimilable as herein used signifies that the micro-organism will grow and proliferate when utilizing the indicated substrate. After a period of growth under submerged aerobic conditions the bacterial cells thus accumulated are harvested by separation from the growth medium.

Thereafter, said micro-organism, after being made nonviable, can be used in animal feed supplements without further processing. In the alternative, the cells may be fractionated to remove nonprotein constituents. Alternately, the protein can be extracted from these micro-organisms by conventional extraction procedures and the protein extract then hydrolyzed or used as a glue, adhesive, etc. Hydrolysis of this protein affords many of the nutritionally essential amino acids useful as food supplements. A suitable protein extraction procedure involves cell breakage, e.g., with acetone or other suitable organic solvents, basic or acid extraction, and isoelectric precipitation.

The process of the present invention constitutes a marked improvement in protein biosynthesis by securing productive growth in good yield at an attractive rate of the aforesaid micro-organism having a valuable combination of properties, i.e., a high-protein content and a good amino acid profile while using inexpensive $C_3$ to $C_{18}$ aliphatic hydrocarbon feeds, i.e., $C_3$ to $C_{18}$ n-paraffins, and n-olefins. Moreover, the micro-organism contemplated herein is readily recovered from the biosynthesis medium in which it is grown, thus enhancing the economic merits of the present invention.

This invention contemplates the use of *Arthrobacter simplex* bacteria. *A. simplex* is categorized as follows in Bergey's "Manual of Determinative Bacteriology," (7th Ed.), 1957.

Order      Eubacteriales
Family      Corynebacteriaceae
Genus      *Arthrobacter*
Species      *simplex*

As is the case with other bacteria, many different strain variants of *Arthrobacter simplex* exist or may be developed from a parent strain. The selection of a particular strain will be dictated primarily by the hydrocarbon substrate chosen to be the source of assimilable carbon and energy. For example, *Arthrobacter simplex* ATCC No. 6,946 will not assimilate propane. Other strains of *Arthrobacter simplex* will multiply only slowly on hydrocarbons shorter than $C_5$. The use of a strain variant of *A. simplex*, which is designated B–129, according to the teaching of the invention, the preferred embodiment. Strain B–129 will multiply rapidly on all normal hydrocarbons from $C_3$ to $C_{18}$.

Cultures of the living organism Strain B-129 have been deposited with the American Type Culture Collectional, Rockville, Md., and have been added to their permanent collection of micro-organisms as ATCC No. 21032.

Strain B–129, developed in accordance with the teaching of the invention from cultures of *Arthrobacter simplex*, was isolated from soil samples obtained in and around the valley regions of San Francisco, Calif. The strain development was by means of the enrichment-culture technique which is well known to those skilled in the art. Briefly, this technique constitutes a means of selecting and isolating a particular strain of bacteria by adjusting the nutritional environment in such a manner as to enhance selectively the growth of the desired bacterial type within a given mixed population. In the development of Strain B–129, the sample of *A. simplex*, as originally obtained from California, was barely viable on propane. Through repeated transfer through successive generations in media-containing propane as the exclusive source of carbon and energy, Strain B–129, which grows readily on propane, was developed. It will be apparent to those skilled in the art that to obtain a micro-organism which grows well on any particular desired hydrocarbon substrate one initially requires a culture which is at least viable on this hydrocarbon. Thereafter, the enrichment-culture technique, as above described, makes it possible to isolate a new strain of this culture particularly suited to growth on the desired hydrocarbon substrate. It is thus seen that the invention involves the discovery that some strains of *Arthrobacter simplex* are at least viable on propane. Further, that a strain of *Arthrobacter simplex* can be developed which proliferates readily on propane.

*Arthrobacter simplex* has the following morphological and cultural characteristics:

Organism:
    A 24 hr. broth culture contains primarily
    rods approximately 0.6 micron by 4 to 6
    microns, occurring singly and in pairs.
    No. chains. No spores. Motile with at
    least one single polar flagellum. Gram
    variable. Motile cells are observed in
    24 hr. broth cultures. Older broth cultures
    contain many short rods, some spherical
    bodies about the width of the rods in
    diameter and fewer long rods, all of which
    stain readily.

Colonies-Nutrient Agar, 5 days, 32° C.
    Off-white, no pigmentation, convex, 4 mm.
    diam. Deep colonies much smaller, irregular
    in shape with pointed lobes growing
    in several directions.

Nutrient Agar Slant:
    Abundant, glistening, moist, echinulate, cream-colored growth which spreads over
surface of agar.

Potato Slant:
Fair growth, moist, light tan. No action
on potato.

Nutrient Broth: (6 days)
25° C. Very good turbidity with fairly heavy
film which becomes thicker and more viscous
after several days. Acquires a cream color
in older cultures. Slight precipitate.
30° C. About same as 25° C.—not heavier.
37° C. Heavier growth of above.
No growth below 15° or above 45° C.

Milk (litmus):
Surface film, reduction at surface followed
by proteolysis throughout. No clot.

Indole:
None formed.

$H_2S$ -peptone ferric ammonium citrate thiosulfate semisolid agar.
Slight darkening (6 days).

Gelatin:
Saccate liquefaction.

Starch:
No hydrolysis.

Nitrates:
Nitrites, ammonia, and $N_2$ formed.

Urease:
Positive.

Catalase:
Positive.

Dextrose and lactose:
No acid, no gas, sl. alkaline.

Citrates:
Growth in Koser's; alkaline slant and butt
in Simmon's.

Strain B–129 usually stains with a great preponderance of Gram negative cells, in both rod and coccus forms, while *A. simplex* ATCC No. 6946 stains predominantly Gram positive in both forms. This is true of young cultures (24 hours old) and also of older cultures (6–10 days old). In addition, *Arthrobacter simplex* (ATCC No. 6946) will not substantially metabolize and assimilate propane in contrast with Strain B–129 which readily assimilates propane.

The micro-organism of this invention requires, as do most other micro-organisms, certain mineral salts as components of the medium in which it grows. An example of suitable mixture of mineral salts for use in the process of our invention is similar to the so-called Bushnell-Haas solution. Our solution contains the following components, the amount in parenthesis being the number of grams used per liter of aqueous solution:

potassium dihydrogen phosphate (1.0)
dipotassium hydrogen phosphate (1.0)
magnesium sulfate heptahydrate (0.20)
calcium chloride (0.02)

This solution was supplemented with 1.0 ml. of a 0.01 percent iron chelate (sodium ferric diethylenetriamine pentacetate) solution and 1.0 ml. of a trace elements solution which had the following mineral salts (the amount in parenthesis is the number of grams used per liter of solution):

boric acid (0.0025)
manganese chloride tetrahydrate (0.0015)
zinc chloride (0.0001)
cupric chloride dihydrate (0.00005)
molybdenum trioxide (0.00005)

Of course, the essential and optional mineral nutrients may be supplied in the form of other salts than those tabulated hereinabove.

A hydrocarbon feed stock suitable for use in the process of this invention is one which is capable of releasing carbon in a form suitable for metabolic utilization by the micro-organism. $C_3$ to $C_{18}$ straight chain alkanes and alkenes have been found to be suitable for Strain B–129 and $C_8$ to $C_{18}$ straight chain alkanes and alkenes for *A. simplex* ATCC No. 6946.

Although the presence of branched aliphatic hydrocarbons (including both olefins and alkanes) in concentrations up to 30 weight percent can be tolerated in the hydrocarbon feed without poisoning the micro-organism, concentrations in excess of 10 weight percent of branched chain aliphatic hydrocarbons in conjunction with the straight chain hydrocarbon feed stock are usually avoided. The aforesaid micro-organisms will preferentially assimilate normal aliphatic hydrocarbons.

The preferred embodiment of this invention contemplates a natural gas fraction comprising in substantial proportions, propane or butane or mixtures thereof as the principal source of assimilable carbon and energy, and the B–129 strain of *A. simplex* as the micro-organism grown on this hydrocarbon feed stock.

The nutrient medium employed for the culture of the bacteria of the invention can vary considerably but must contain, in addition to a suitable hydrocarbon substrate and inorganic salts, a source of assimilable nitrogen. In the preferred embodiment of this invention ammonium nitrate is the source of assimilable nitrogen. However, a wide variety of other nitrogenous compounds both organic and inorganic, may also be used. Suitable alternate sources of nitrogen, for example, include: sodium nitrate, ammonium sulfate, ammonium phosphate or other ammonium salts; simple nitrogenous organic compounds such as urea, biuret, guanidine; and the like. The concentration of suitable nitrogen source material in the nutrient medium may vary considerably but is generally employed in amounts of from about 0.05 to 2 percent by weight.

Although the invention is not to be construed so as to be limited thereto, the startup of fermentation may be effected by inoculation of the growth medium with a starter culture of the micro-organism to be harvested, e.g., by use of a previously cultivated inoculum in the same medium in which it is to be grown, e.g., as described above. The initial concentration of inoculum containing said micro-organism at the outset of fermentation may vary widely, e.g., 0.0005 to 50.0 grams per liter of total fermentation medium. Other inoculation procedures may be employed, e.g., use of an inoculum where said micro-organism is previously grown on a medium different from that in which the fermentation is to be conducted and then transferred to the fermentation vessel(s).

Growth of the micro-organism generally proceeds over a temperature range of from about 15° C. to about 45° C. Optimum growth occurs at a temperature between about 24° C. and about 30° C. The preferred pH range is from about 6.0 to about 8.0. As the culture grows, the medium tends to become more acidic. Therefore, it may be desirable to adjust the pH of the medium periodically with a base such as ammonium hydroxide, potassium hydroxide, sodium hydroxide, calcium oxide, calcium hydroxide, or sodium carbonate. Alternatively, buffering materials can be used, in which case they can conveniently be added to the nutrient medium prior to fermentation by diluting the ingredients with an aqueous solution to obtain the desired volume of culture medium. One such suitable buffering solution having a pH of 7.4, (for example) can be prepared by mixing an aqueous solution of 11.88 grams of $Na_2HPO_4 \cdot 2H_2O$ per liter of water and a solution of 9.08 grams of $KH_2PO_4$ per liter of water, and mixing them in a 4:1 ratio.

The process can be operated at atmospheric pressure or at any convenient superatmospheric pressure. Where the hydrocarbon feed stock is volatile, it is preferred to use a closed system to insure maximum utilization of the substrate by the micro-organism and to prevent loss of the volatile substrate into the atmosphere. If a liquid hydrocarbon feed stock is utilized, a suitable amount thereof is from 10 to 100 grams/liter of culture medium.

The culturing of the micro-organisms in accordance with the process of this invention is carried out under aerobic conditions. While sufficient aeration is generally obtainable in small flasks by mechanical agitation during the fermentation period, it is important in larger scale operations that the culture broth be stirred mechanically and that sterile air be introduced into the vessels by known methods. It has been generally found desirable to introduce from about one-half to 1 volume of air per minute for each volume of fermentation broth. If a gaseous hydrocarbon feed is used, a ratio of air/hydrocarbon by volume of from 1/1 to about 4/1 is suitable. In the alternative, pure oxygen, oxygen enriched air, or a mixture of oxygen, nitrogen and carbon dioxide may be used to maintain aerobic conditions.

In batch operation, the micro-organism will usually grow initially at a low rate of increase in cellular density. (This period of growth is referred to as the "lag phase.") Subsequently the rate of growth will increase to a higher rate of growth, (the period at the highest rate of growth is referred to as the "exponential phase") and thereafter the cellular density will become constant (the "stationary phase"). A supply of the micro-organism for starting the next batch will preferably be removed before the termination of the exponential phase.

The process can also be operated on a continuous basis. In either a batch or continuous process it is desirable to vigorously agitate the culture medium during the entire growth period and particularly during the exponential phase to promote transfer of substrates and removal of byproducts by stirring, bubbling air into the culture liquid, etc.

The growth operation will usually be terminated at the onset of the stationary phase and the micro-organism will be separated from the growth medium. A suitable growth period is from 1 to 8 days. Any method such as will be known to one skilled in the art can be used to separate the cells from the culture broth for harvesting, as for example filtration or centrifugation. The fraction containing the micro-organism is a suitable source of food for both animals and humans. The filtered cells may be dewatered, e.g., using rotary drum dryers, spray dryers, etc., although this is not absolutely necessary. The cells may be rendered nonviable before use by spray drying at 150°–185° C. for from 2–30 seconds. Care should be exercised during pasteurization to avoid extreme temperatures for extended time periods when the harvested cells are to be used as a protein supplement (in order to avoid protein degradation.) If desired, the harvested micro-organism may be subjected to autolysis and/or further purification.

If the micro-organism cells are to be used in making glues, adhesives, etc., it is not necessary to render them nonviable as the protein extraction procedures suffice. The same is true when the micro-organism cells are grown and harvested for their intracellular chemicals, e.g., amino acid content.

The following examples further illustrate our invention. All parts are parts by weight unless otherwise expressly noted.

EXAMPLE 1

A culture of Strain B-129 of *Arthrobacter simplex* developed by the enrichment-of-culture technique was maintained in an aqueous growth medium under a 50/50 v./v. percent propane/air atmosphere. The liquid medium was of the following composition:
$NH_4NO_3$    1.0 gm.
$MgSO_4 \cdot H_2O$    0.20 gm.
$CaCl_2$    0.20 gm.
$KH_2PO_4$    1.00 gm.
$K_2HPO_4$    1.00 gm.
Deionized Water    1,000 ml.
Trace Element Solution    1.0 ml.
The trace element solution contains:
$H_3BO_3$    0.0025 g./ml.
$MnCl_2 \cdot 4H_2O$    0.0015 g./ml.
$ZnCl_2$    0.0001 g./ml.
$CuCl_2 \cdot H_2O$    0.0005 g./ml.
$MoO_3$    0.0005 g./ml.
Sequestrine 330 Iron    1.0 mg./ml.
Chelate The medium was dispersed into side arm Erlenmeyer flasks, fitted with a gassing stopper. Medium volumes were as follows for different flask sizes: 50-ml. medium/250-ml. flask and 100-ml. medium/500-ml. flask. The liquid:gas ratio was 1:5 in each case.

This liquid growth medium was inoculated with a 1 volume percent inoculum. The pH of the medium at inoculation ranged from 6.7 to 6.9 after inoculation the flasks were evacuated and refilled with the propane/air mixture to atmospheric pressure. The flasks were then incubated at room temperature (24°–26° C.) on a reciprocative shaker at 115, 2½-inch strokes/minute or on a thermostated gyrotory shaker (30° C./250 r.p.m.). Propane and oxygen were consumed, carbon dioxide was produced and the turbidity of the growth medium increased steadily. All of which indicated that the organism was proliferating.

EXAMPLE 2

A cultivation of Strain B-129 was carried out in a large fermentor using the growth medium of example 1. Experimental conditions were as follows:
1. Liquid med. vol.=10 liters
2. Inoculum conc.=5.0 percent
3. Agitation=400 r.p.m.
4. Gas flow—5 liters/hour (50/50 air/propane (v./v.)
5. Initial pH=6.5, maintained at 6.5 by periodic addition of KOH
6. Temp.=29° C., Time=66 hours
7. Cell harvest—continuous centrifugation in
   Sorval Hi-Speed Centrifuge
   Flow rate 4.5 l/hour
   r.p.m.=17,000
   Temp.=2° C.
   Yield=6.03 g.
cells were washed 3 times with deionized cold $H_2O$
and lyophilized.
   Lyophilized Cells
   white to light buff color, fluffy texture
   Typical analysis of lyophilized *Arthrobacter simplex* B-129
   %N=11.94–13.89 (3 preps.)
   %C=46.33–46.0
   %H=6.77–7.2
   %S=1.5 percent
   Equivalent to a 74.63 to 86.81 percent protein content assuming all nitrogen is proteinaceous.
Amino acid profile of lyophilized product obtained in Example 2.

WT. % COMPOSITION OF AMINO ACID MIXTURE

OBTAINED BY HYDROLYSIS OF CEll PROTEIN

|  | 1 | 2 | 3 |
| --- | --- | --- | --- |
| Alanine | 7.3 | 6.5 | 6.6 |
| Valine | 5.5 | 5.4 | 5.7 |
| Glycine | 3.7 | 4.0 | 4.1 |
| Isoleucine | 3.5 | 4.2 | 4.1 |
| Leucine | 7.4 | 6.6 | 6.9 |
| Proline | 2.9 | 2.8 | 3.0 |
| Threonine | 3.4 | 4.0 | 4.5 |
| Serine | 2.4 | 3.4 | 2.8 |
| Methionine | 0.5 | 0.7 | 0.3 |
| Phenylalanine | 3.8 | 3.6 | 3.4 |
| Aspartic | 7.3 | 5.8 | 6.5 |
| Glutamic | 8.7 | 8.1 | 8.2 |
| Tyrosine | 0.8 | 1.1 | 0.8 |
| Lysine | 4.4 | 4.3 | 3.3 |
| Unidentified | — | — | — |

As will be noted from the above data, the micro-organism harvested in accordance with this invention possesses the valuable combination of a high-protein content in excess of 50 percent and a nutritionally attractive amino acid profile. This evidences the advantages of using the present invention which enables one to harvest usable protein by biosynthesis in an extremely economical manner when using this micro-organism.

Thus, the present invention is especially useful in preparing animal feed supplements having significant protein and overall nutritional value.

EXAMPLE 3

In order to determine the suitability of hydrocarbons other than propane as sources of carbon and energy for strain B-129 of *Arthrobacter simplex* a series of flasks containing the aqueous nutrient medium of example 1 and 10 volume percent of a series of hydrocarbons were inoculated with cultures of the micro-organism of example 1. When the hydrocarbon was gaseous at room temperature the introduction procedure of example 1 was followed. The inoculated culture flasks were maintained at 30° C. in a thermostated gyrotory shaker. The organism was found to assimilate the following normal hydrocarbons: propene, butane, pentane, octane, decane, decene, dodecane, hexadecane, hexadecene and octadecane.

The organism would not assimilate methane, ethane, isobutane, isobutylene, isooctane or natural gas.

EXAMPLE 4

The procedure of example 1 is followed except that the following inorganic and simple organic nitrogen containing compounds individually are substituted for ammonium nitrate. *A. simplex* B-129 is able to assimilate and multiply utilizing nitrogen from the following sources: ammonium sulfate, ammonium chloride, sodium nitrate and urea.

EXAMPLE 5

The procedure of example 1 was followed except that after inoculation additional propane/air mixture was introduced into a suitable vessel until the internal pressure was 50 p.s.i. Growth of *A. simplex* B-129 occurred.

EXAMPLE 6

The procedure of example 3 was followed utilizing *Arthrobacter simplex* ATCC No. 6946. This strain was found to assimilate dodecane and hexadecane. It did not assimilate propane.

EXAMPLE 7

The accompanying process flow sheet illustrates means suitable for the production scale cultivation of *A. simplex* B-129 using propane as the source of assimilable carbon.

The micro-organisms are grown in a culture tank 10, which is similar to a conventional sieve plate column and is provided with a plurality of sieves 11. A pasteurized and cooled solution of the necessary inorganic nutrient 12 is inoculated with a small quantity of culture, 13, admixed at 14 with a suitable source of nitrogen 15, introduced into line 16, and thence into the top of the culture tank 10 at 17 and passed down the culture tank.

Propane gas from a Liquefied Petroleum Gas (LPG) vaporizer 18 admixed with air 19 from a suitable source, e.g. an air blower 20 is introduced into the bottom of the culture tank 10. Operating pressure, residence time, and liquid and gas flow rates may be varied until the best overall rate of cell growth and final cell concentration is determined.

After the growth phase, the suspension of micro-organism cells is drawn from the bottom of the tank at 21, a small amount is recycled at 22 to inoculate the incoming nutrient solution at 23 and the remainder 24 passes to the primary centrifuge 25. The primary centrifuge 25 concentrates the cells to a creamy slurry containing about 10 percent dry matter which is washed with clear water 26 and passed at 27 to the secondary centrifuge 28. In the secondary centrifuge 28 the slurry is rewashed 29 and concentrated to a paste 30 containing up to about 25 percent dry matter. The spent liquor and washings 32 and 33 from both sets of centrifuges pass to a recovery operation 34 and the reconditioned culture liquor at least in part is fed back at 35 into line 16.

The paste of micro-organisms 30 from the secondary centrifuge 28 undergoes lysis by passing through the jacketed mixer 31. Here the temperature is raised to 150° to 180° C. by steam 36 in the jacket of the mixer 31 and the micro-organisms are killed. In this process the cells burst, setting free the liquid contents, and the pasty mass becomes liquid. This liquid 37 is pumped to a filter 38 where the protein content is increased by filtering off the insoluble, nonprotein cell wall fragments 39 optionally aided by wash water 40.

The filtered solution 41 is dried on a rotary drum drier 42 to a meal containing not more than 5 percent water. This product 43 which contains 65 percent or more crude protein, together with a good supply of vitamins, may be bagged as a meal or as pellets, stored and shipped 44. The waste liquors from the centrifuges will contain unused nutrients, carbon dioxide and waste products of the cell growth process. Besides the inorganic nutrient materials, these liquors will contain large amounts of water; all of this may be cleaned up for recycle. The extremely simple cleanup is illustrated in the flow diagram. Input of the anhydrous ammonia 45 with sparging air 46 is used to take advantage of the dissolved carbon dioxide as a carrier for the ammonia. From the cleanup and recovery 34, the recycle liquor receives makeup quantities of the inorganic nutrients required in line 16. Then, after pasteurization 47, cooling 48, and inoculation at 23, the solution returns to the culture tank 10 for another pass. The gases 49 from the culture tank will contain a substantial amount of propane. This will be recovered by scrubbing at 50 with a hydrocarbon oil 51 (a distillate fuel oil is satisfactory.) The scrubbed gases may be vented at 52 to the atmosphere while the rich oil 53, now containing propane, goes to the desorber 54 from which the propane is transferred at 55 to input air for the culture tank 10.

Various modifications will be apparent to one skilled in the art and it is not intended that this invention be limited to the details in the specific examples presented by way of illustration. Accordingly, the scope of the invention is limited only by the appended claims.

We claim:

1. A process which comprises cultivating the micro-organism *Arthrobacter simplex* B-129 (ATCC No. 20132) in an aqueous culture medium containing a $C_3$ to $C_{18}$ n-paraffins as the principal source of assimilable carbon and energy and a source of assimilable nitrogen and inorganic salts at a suitable incubation temperature and for a suitable period of cultivation under submerged aerobic conditions and thereafter separating the organism growth from said culture medium.

2. A process according to claim 1 wherein the straight chain hydrocarbon is selected from the group consisting of propane, butane.

3. A process according to claim 1 wherein the source of assimilable nitrogen is a compound selected from the group consisting of ammonium nitrate, ammonium chloride, sodium nitrate and urea.

4. A process according to claim 1 wherein the culture medium is maintained by a pH of from about 6.0 to 8.0.

5. A process according to claim 1 conducted under a superatmospheric pressure.

6. A process according to claim 1 wherein the aqueous culture medium is maintained at a temperature of from about 24° C. to about 30° C.

7. The process of claim 1 wherein the hydrogen is propane and wherein said hydrocarbon is introduced into the aqueous culture medium as a gaseous mixture with oxygen in the substantial absence of other organic substrates.

8. In the process of claim 1 the step which comprises aerating the medium by stirring it in the presence of an atmospheric containing free oxygen gas.

9. In the process of claim 1 the step which comprises separating the organism growth from the aqueous culture broth by centrifugation.

* * * * *

PO-1050
(5/69)

UNITED STATES PATENT OFFICE
CERTIFICATE OF CORRECTION

Patent No. 3,622,465    Dated November 23, 1971

Inventor(s) Gerald Orgel, Edward W. Pietrusza and George G. Joris

It is certified that error appears in the above-identified patent and that said Letters Patent are hereby corrected as shown below:

Column 2, line 21, after "invention" insert -- , comprises--.

Column 5, line 68, "$CuCl_2 \cdot H_2O$" should be --$CuCl_2 \cdot 2H_2O$--.

Claim 1, column 8, line 42, "(ATCC No. 20132)" should be --(ATCC No. 21032)--.

Claim 4, column 8, line 57, "by" should be --at--.

Claim 8, column 8, line 68, "atmospheric" should be --atmosphere--.

Signed and sealed this 23rd day of May 1972.

(SEAL)
Attest:

EDWARD M. FLETCHER, JR.         ROBERT GOTTSCHALK
Attesting Officer               Commissioner of Patents